United States Patent
Strüber et al.

(10) Patent No.: US 10,234,205 B2
(45) Date of Patent: Mar. 19, 2019

(54) METHOD AND APPARATUS FOR CHARGING PALLET CARS OF A TRAVELING GRATE FOR THE THERMAL TREATMENT OF BULK MATERIALS

(71) Applicant: OUTOTEC (FINLAND) OY, Espoo (FI)

(72) Inventors: Georg Strüber, Itzig (LU); Markus Schuster, Stuttgart (DE); Siegfried Schimo, Friedrichsdorf (DE); Roberto Valery, Oberursel (DE); Stephanie Winkler, Remich (LU); Suvi Rannantie, Frankfurt am Main (DE); Matthias Bergmann, Bad Homburg (DE); Karl-Heinz Hofmann, Hungen (DE); Katharina Kremmer, Frankfurt am Main (DE); Vincent Siauw, Frankfurt am Main (DE); Basavan Salagundi, Oberursel (DE); Michael Ströder, Frankfurt am Main (DE); Roger Becker, Pfungstadt (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/999,180

(22) Filed: Aug. 16, 2018

(65) Prior Publication Data
US 2018/0372410 A1    Dec. 27, 2018

Related U.S. Application Data

(63) Continuation of application No. PCT/EP2017/053646, filed on Feb. 17, 2017.

(30) Foreign Application Priority Data

Feb. 19, 2016 (DE) .......... 10 2016 102 957

(51) Int. Cl.
*C22B 1/20*     (2006.01)
*F27D 3/12*     (2006.01)
(Continued)

(52) U.S. Cl.
CPC ............. *F27D 3/123* (2013.01); *C22B 1/20* (2013.01); *F27B 21/06* (2013.01); *F27D 99/0073* (2013.01); *F27D 2003/0034* (2013.01)

(58) Field of Classification Search
CPC ............. F27D 3/123; F27D 99/007; F27D 2003/0034; C22B 1/20; C22B 1/16
(Continued)

(56) References Cited

U.S. PATENT DOCUMENTS 3,042,390 A * 7/1962 Rausch ........... B01J 19/00
                                                         266/179
3,102,153 A * 8/1963 Munch ............ C22B 1/20
                                                         198/795

(Continued)

FOREIGN PATENT DOCUMENTS

| CN | 103160683 A | 6/2013 |
| CN | 204329609 U | 5/2015 |

(Continued)

OTHER PUBLICATIONS

International Search Report issued by the European Patent Office acting as the International Searching Authority in relation to International Application No. PCT/EP2017/053646 dated May 11, 2017 (4 pages).

(Continued)

*Primary Examiner* — Kaitlin S Joerger
(74) *Attorney, Agent, or Firm* — Robert P. Michal, Esq.; Carter, DeLuca & Farrell LLP

(57) ABSTRACT

A method for charging pallet cars of a traveling grate for the thermal treatment of bulk material includes in a first step a
(Continued)

first layer is applied as a hearth layer on a grate surface of the pallet car. In at least one second step a second layer at the same time or successively is applied as a side layer on two opposed side walls of the pallet car and a third layer is applied as green pellet layer between the side layers and on the hearth layer. The pellets used for the grate and the side layer differ in terms of their diameter and size distribution.

14 Claims, 3 Drawing Sheets

(51) Int. Cl.
  *F27B 21/06* (2006.01)
  *F27D 99/00* (2010.01)
  *F27D 3/00* (2006.01)
(58) Field of Classification Search
  USPC .......................................... 414/154, 156, 157
  See application file for complete search history.

(56) References Cited

U.S. PATENT DOCUMENTS

| | | | | |
|---|---|---|---|---|
| 3,148,763 | A * | 9/1964 | Sawada | C22B 1/20 193/28 |
| 3,393,904 | A * | 7/1968 | Taylor | B29C 67/04 266/179 |
| 4,091,545 | A * | 5/1978 | Izawa | C22B 1/005 209/11 |
| 4,468,253 | A | 8/1984 | Tajima et al. | |
| 4,871,393 | A * | 10/1989 | Fujimoto | B07B 1/12 75/386 |
| RE33,935 | E * | 5/1992 | Fujimoto | B07B 1/12 266/178 |
| 5,529,488 | A * | 6/1996 | Jensen | F27D 3/123 298/35 R |
| 6,063,160 | A * | 5/2000 | Krogerus | C22B 1/20 264/652 |
| 8,726,537 | B2 * | 5/2014 | Palander | C22B 1/20 166/252.1 |
| 9,027,743 | B2 * | 5/2015 | Schulakow-Klass | B65G 35/08 198/795 |
| 2007/0166420 | A1 * | 7/2007 | Pammer | C22B 1/20 425/130 |
| 2013/0130185 | A1 * | 5/2013 | Herlevi | C22B 1/20 432/12 |
| 2015/0093710 | A1 * | 4/2015 | Friedlaender | F27D 3/0033 432/28 |
| 2015/0139267 | A1 * | 5/2015 | Della Vedova | F27B 3/28 373/79 |
| 2015/0233641 | A1 * | 8/2015 | Schulakow-Klass | F27B 21/06 414/157 |
| 2017/0321963 | A1 * | 11/2017 | Pancher | F27D 3/123 |

FOREIGN PATENT DOCUMENTS

| | | |
|---|---|---|
| DE | 4109396 A1 | 9/1992 |
| GB | 995801 A | 6/1965 |
| KR | 20140070038 A | 6/2014 |

OTHER PUBLICATIONS

Written Opinion of the International Searching Authority issued by the European Patent Office acting as the International Searching Authority in relation to International Application No. PCT/EP2017/053646 dated May 11, 2017 (6 pages).

International Preliminary Report on Patentability including the Written Opinion of the International Searching Authority issued by The International Bureau of WIPO in relation to International Application No. PCT/EP2017/053646 dated Aug. 21, 2018 (7 page).

* cited by examiner

METHOD AND APPARATUS FOR CHARGING PALLET CARS OF A TRAVELING GRATE FOR THE THERMAL TREATMENT OF BULK MATERIALS

CROSS-REFERENCE TO RELATED APPLICATIONS

This application is a continuation of PCT International Application No. PCT/EP2017/053646 filed Feb. 17, 2017, which claims priority to German Patent Application No. 10 2016 102 957.2, filed Feb. 19, 2016, the disclosure of each of these applications is expressly incorporated herein by reference in their entirety.

This invention relates to a method for charging pallet cars of a traveling grate for the thermal treatment of bulk materials, in a first step comprising an application of a first layer as hearth layer on a grate surface of the pallet cars formed by cross-beams and grate bars arranged on the same, and in at least one second step comprising the simultaneous or successive charging with a second layer as side layer on two opposed side walls of the pallet cars and with a third layer as green pellet layer between the side layers and on the hearth layer. This invention also relates to a plant for carrying out this method.

In pellet induration or sintering plants the bulk material to be treated, for example iron ore, iron oxides, iron hydroxides or also zinc or lead or manganese ore, is charged onto pallet cars. These pallet cars consist of a frame equipped with wheels and of grate bars arranged on cross-beams. A plurality of such pallet cars forms an endless pallet car chain, which also is referred to as traveling grate.

FIG. 1 by way of example shows a pellet induration plant 1 for curing green iron ore pellets, in which the present invention is employed. In a charging zone, the bulk material is charged onto pallet cars 3 which form an endless pallet car chain referred to as traveling grate 4. Under the hood 2 the bulk material transported on the pallet cars 3 passes through a plurality of thermal treatment stations. In details, these stations are:
1. the charging zone,
2. the first drying zone,
3. the second drying zone,
4. the prefiring zone,
5. the firing zone,
6. the afterfiring zone,
7. the cooling zone, and
8. the discharge zone.

In these zones the pallet cars are charged with the material, the bulk material is dried, preheated, fired and subsequently cooled again. At the treatment stations under the hood 2 the traveling grate is guided on an upper run 5 of a continuous conveyor 6, wherein the track rollers 7 of the pallet cars 3 are guided between an inner rail guide 8 and an outer rail guide 9. The drive of the traveling grate 4 is effected via a drive or lifting wheel 10 which is formed as gearwheel and with its tooth gaps (cutouts 11) engages the track rollers 7 of the pallet cars 3.

After passing through the hood 2, the pallet cars 3 of the traveling grate 4 reach a discharge zone which is associated to a lowering or driven wheel 13 of the continuous conveyor 6. At the lowering wheel 13, like at the lifting wheel 10, tooth gaps 14 of the driven gearwheel engage the track rollers 7 of the pallet cars 3. The pallet cars 3 are tilted, so that their load is dumped by gravity. Since the pallet cars 3 are guided by the outer rail guide 9, they do not fall down themselves, but are guided back to the lifting wheel 10 standing upside down in a lower run 15 of the continuous conveyor 6.

In normal operation, the traveling grate 4 endlessly circulates on the continuous conveyor 6 and transports the bulk material to be treated through the treatment stations under the hood 2, before it is dumped at the discharge station and processed further in a non-illustrated way.

To be able to reliably remove the material undergoing thermal treatment from the pallet car in the discharge region, it is desirable that the material to be treated has no direct point of contact with the pallet car. This can be achieved in that a contact between green pellets and pallet car or side walls of the pallet car is avoided.

At the same time, however, grate bars and side walls also need to be protected against high temperatures. As the green pellets must be exposed to very high temperatures, in order to achieve a good product quality, another material is used in the region of the grate bars and side walls, so that the temperatures here can be slightly lower.

For this purpose, a so-called hearth layer on the one hand is applied onto the described grate surface of the pallet car, which consists of pellets fired already, which therefore adhere less and in addition no longer must be subjected to certain minimum temperatures.

Furthermore, the pallet car usually includes two side walls which are formed parallel to the direction of movement of the traveling grate proceeding from the grate surface. Typical angles of these side walls to the grate surface lie between 90 and 120 degrees. After the hearth layer has been applied, the side walls likewise are protected by applying so-called side layers, i.e. two beds of fired pellets along the side walls.

Subsequently, the so-called green pellet charge is applied between these so-called side layers and on the hearth layer, i.e. the charge including that material which is to be subjected to the thermal treatment. For the hearth layer and the side layers there is usually employed material which already has passed through the thermal treatment, i.e. so-called fired pellets. This has the advantage that on drainage of the pallet cars a homogeneous product is contained in the pallet car, the pellets fired already do not react further during their repeated passage through the thermal treatment and as former product of the thermal treatment provide the same material properties as the thermally treated material. Thus, a further separation of foreign material is not necessary.

It was found out, however, that such charging must satisfy different requirements. The hearth layer must be designed such that it provides for a rather uniform and hardly inhibited through-flow of the green pellet covering and safely prevents that at individual points gas flowing through from top to bottom or from bottom to top does not reach the green pellets or that gas channels are formed. The side layers on the other hand should seal the side walls against the green pellet layer as good as possible, i.e. in the ideal case should almost not be traversed or not be traversed at all by the gas flow.

It thus is the object underlying the invention to ensure that a homogeneous through-flow of the green pellet layer is achieved, while the side walls of the pallet car are protected at the same time. For this purpose the hearth layer consists of fired pellets with a mean diameter between 10 and 20 mm, wherein at least 85 wt-% of the pellets have a diameter in the range between 10 and 20 mm, so that in general the distribution of the pellet diameters of the hearth layer is as homogeneous as possible. In this way a small pressure drop of the hearth layer is achieved upon through-flow of gas, which has a favorable influence on the electricity consumption of the corresponding blower.

Other than in the prior art, the hearth layer and the side layers now are not formed of one and the same material, but consist of different materials. On the one hand the side layer can contain between 0 and 100 wt-% pellet breakage, which means that the pellets broken as a result of the thermal treatment and/or mechanical stress are not discharged from the system as before, but are reused for forming the side layer. The size of such pellet breakage particles typically lies between 10 μm and 8 mm.

Furthermore, the side layer additionally or exclusively can consist of a mixture of two fractions A and B of fired pellets, wherein the pellets of fraction A have a mean diameter with any value between 5 and 13 mm, and wherein the diameter of at least 85 wt-% of the material of fraction A has values in the range between 5 and 13 mm. Furthermore, the side layer can contain pellets of fraction B, which have a mean diameter with a value larger than 14 mm, preferably with a value in a range between 14 and 20 mm, and wherein the values of the diameters of at least 85 wt-% of the material of fraction B is greater than 14 mm.

The side layer should consist of fraction A for 0 to 100 wt-%. This means that the side layer already can consist of very small pellets for 100 wt-%, which provides the advantage that here a low permeability can be achieved.

Furthermore, the side layer can be a mixture of material of fraction A and pellet breakage, wherein due to its often even smaller particle sizes the pellet breakage then can close voids between the pellets of fraction A. It likewise is possible to choose a mixture of material of fraction B and pellet breakage for the side layer.

In addition, the side layer also can consist of a mixture of fraction A with fraction B. This offers the advantage that the pellets of fraction A selectively can settle into voids between the pellets of fraction B, whereby a very large bulk density and thus a low permeability likewise is achieved without fine dust and other small particles contained in the pellet breakage being recirculated in the process and hence also accumulated at least in part.

Moreover, it is possible that the side layer is a mixture of pellet breakage and the fractions A and B, whereby a maximum bulk density and a minimum permeability are achieved.

Finally, the side layer can consist of pellet breakage only, which would lead to 0 wt-% for both fractions A and B.

All measures have in common that the permeability of the side layer is decreased in this way.

The green pellet layer, i.e. those pellets which have not yet undergone a thermal treatment, is applied such that the unfired pellets have a mean diameter which is at least 2 mm larger than the mean diameter of fraction A. The green pellet layer thus differs distinctly from the side layer. The objective of the invention, namely that the permeability of the side layer is smaller than the permeability of the green pellet layer, is achieved therewith.

As a result, a highly permeable layer thus is produced for the hearth layer, while the side layers have a permeability as low as possible and thus are traversed by gas to a smaller extent or virtually not anymore. The side walls of the pallet cars hence are protected against very high temperatures, which would shorten the useful life of the side walls.

Preferably, the side layer contains between 20 and 90 wt-% of fraction A, as the permeability can be optimized in this way.

In a favored embodiment of the invention the side layer is caused to vibrate during and/or after being charged into the pallet cars.

This can be achieved by vibrating the side walls of the pallet car adjoining the side layers and/or vibrating a partition between side layer and green pellet layer. It also is possible to incorporate at least one device, which then likewise vibrates, into the side layer or place it on the same. Such device might be bars or a punch or also a wheel running on the upper surface of the side layer. The side layer thereby is compacted in addition and its permeability is lowered further.

The objective of the invention, namely to adjust a permeability in the side layer lower than in the green pellet layer, can of course also be achieved when only the vibration of the side layer is used, but the side layer consists of the same material as the hearth layer or even of material of the same diameter distribution as the green pellet layer.

The compaction of the side layer proceeds particularly well if the vibration has the natural frequency of the side walls. This can be produced for example when the vibration is a torsional vibration along the screw connection of the side wall with the frame of the pallet car. The axis of this torsion is a horizontal axis in the moving direction of the traveling grate at the interface between the frame and the side walls of the pallet car. According to the invention, the side walls rotate at high frequency and low amplitudes around this axis. At the same time, a compaction of the green pellet layer thus can be prevented, because due to friction the intensity of the vibration decreases with increasing penetration depth of the vibratory oscillation.

Due to the vibration, an additional compaction of the side layer occurs, and thus especially in the region of the side layer sagging of the filling level in the pallet car also occurs.

When a partition wall is arranged between side layer and green pellet layer in the region of the fill, the material also will sag after passing this partition. To ensure the same filling level everywhere in the pallet car, it is recommendable to fill up sagged regions of the bed surface with side layer material, pellet breakage and/or pellets of fraction A and/or fraction B to the level of the upper edge of the side walls.

The hearth layer preferably has a layer thickness between 3 and 10 cm, preferably 7+/−2.0 cm. Hence, so many pellets are placed one above the other that it can be ensured that a homogeneous flow is formed over the entire grate surface and at the same time the height of the hearth layer is minimized to the effect that the volume available for the green pellets is not reduced unnecessarily. In addition, this thickness was found to be sufficient to keep too high temperatures away from the grate bars. The traveling grate is operated at such a rate that the lower region of the hearth layer just no longer is exposed to the full firing temperature of the green pellets. On the other hand, the thickness of the hearth layer is to be chosen such that the bottommost green pellets nevertheless are exposed to the necessary firing temperature, so that they attain a sufficient quality.

What also is preferred is a mean layer thickness of a side layer between 5 and 15 cm, preferably 7 to 11 cm, wherein the layer thickness of the side layer very well can vary along the height proceeding from the grate surface and therefore reference should be made to the mean layer thickness. This layer thickness is sufficient to reliably protect the side walls against very high temperatures, without an unnecessary loss of volume occurring in the region of the green pellet layer.

Furthermore, it was found to be favorable to take the pellets for hearth layer and side layer from the total content of the pallet car after curing of the iron ore pellets and recirculate them directly to the charge. Even in the case of longer-term fluctuations in the feed material it can thus be ensured that the entire content of the pallet car always has the same composition. In the most favorable case, maintaining stocks of the hearth and side layers thus can be omitted completely, but at least in part.

The invention furthermore comprises a plant for charging pallet cars of a traveling grate for the thermal treatment of bulk material, wherein this plant in a charging zone includes at least one chute for applying a first layer as hearth layer on a grate surface of the pallet cars and at least one second chute for charging with at least one second layer as side layer on two opposed side walls of the pallet cars. Usually, there is employed a second and a third chute which each charge one side layer. Furthermore, the plant comprises a charging device for introducing a third layer as green pellet layer between the side layers and on the hearth layer. This device preferably is a roller screen, in order to transport the green pellets as gently as possible and thus minimize breakage.

According to the invention the plant furthermore comprises two separate conveyor belts, wherein one conveyor belt feeds the chute for applying the hearth layer and the other one feeds the at least second chute, preferably the second and third chutes for charging with the side layers, and wherein the two conveyor belts transport pellets with different mean diameters or diameter distributions.

Within the charging zone, such plant preferably at least partly includes a partition which is oriented parallel to the direction of movement of the traveling grate and is arranged at an angle which is aligned between the angle of the respective side wall and 90 degrees to the grate surface. During operation of the traveling grate, it at least partly protrudes into the pallet car.

There is either preferred an alignment at the same angle as the respective side wall, as the side layer thus has the same thickness at every position. However, an alignment between 85 and 90 degrees relative to the grate surface furthermore is preferred as well, in particular when the angle of the two side walls is smaller than 90°. This has the advantage that the thickness of the side layer increases with increasing bulk height. On the one hand, it can thereby be avoided that the green pellet layer undergoes such expansion and the flow thus becomes more inhomogeneous over the entire green pellet layer in its full bulk height. On the other hand, losses in the bulk height due to compaction by means of vibration and/or due to the removal of the partition can at least partly be compensated by the expanded side layer thickness.

Furthermore, it was found to be favorable when the partition is aligned such that during operation it protrudes into the pallet car such that it ends exactly at the height of the surface of the hearth layer. As a result, it does not penetrate into the hearth layer and here changes the local bed, but on the other hand the side layer is completely separated from the green pellet layer and there is no bleeding of material for the side layer into the region of the green pellet layer or vice versa.

It furthermore is favorable when the partition is attached to the at least one second chute. Preferably there are two partitions, attached to the second and third chutes, for charging with the respective side layers, as the partition thus is provided with the side layer exactly at the charging position, without further fastening devices being necessary.

In a development of the invention there is also provided a device for vibrating the side walls adjoining the side layer and/or the partition between side layer and green pellet layer and/or at least one device which is placed on and/or incorporated in the side layer. The side layer thereby can be vibrated without the green pellet layer being compacted, which in turn would be disadvantageous, as here an undisturbed gas flow no longer is possible then. In a particularly preferred variant, this vibration device is designed such that for example in the side wall it transmits the vibration in the range of the natural frequency of the side wall. This has the advantage that the mechanical power of the vibration drive can be chosen lower than in the case of a vibration with another frequency. In any case, the vibration power must be limited such that only the side layer is compacted, but not the green pellets.

Furthermore, the invention also comprises a plant in which the at least the second chute, preferably the second and third chutes, which introduces the side layer, is designed such that it also fills at a position at which the pallet cars in operation of the traveling grate already have passed the partition and/or the device for vibration of the side layer. This is possible for example by an expansion of the opening region of the chute in the direction of movement of the traveling grate. As a result, no separate charging device is required to compensate sagged regions of the bed surface after passing the partition and/or after the vibration.

Finally, the invention specifically also comprises a conveyor belt for the exclusive transport of the material for charging a pallet car with a hearth layer, wherein this hearth layer is applied as first layer onto the grate surface of at least one pallet car, and a second conveyor belt for charging at least one pallet car with side layers on two opposed side walls of the at least one pallet car.

In summary, it is the idea underlying the invention that due to the higher permeability of the hearth layer the pressure drop in the hearth layer decreases, whereby the electric power of the blower used to effect the through-flow of gas through hearth layer and green pellet layer can be lowered.

Due to the lower permeability of the side layer undesired gas streams (bypass effects) through the side layers are reduced distinctly, whereby lower temperatures are obtained at the side walls. The temperature stress for the side walls thereby is lowered. In the best case it can also be achieved that the thickness of the side layer, which typically lies between 7 and 8 cm, can be reduced, whereby a higher loading capacity for the green pellet layer and thus a total increase in productivity of the method and an increase in capacity of the associated plant is possible.

Another advantage of the invention consists in that the gas stream which flows through the side layer is reduced significantly, so that the process gas is forced through the green pellet bed more strongly. As the gas flow through the side layer only leads to an unnecessary thermal stress of the side walls, the capacity of the plant can be increased by reducing this gas flow on the entire length of the upper run of the traveling grate. First simulations also show an increase in energy efficiency. This is plausible because as a result of the invention the side walls of the pallet car are heated to a lower maximum temperature, as the side walls are cooled again in the lower run of the traveling grate, wherein the heat dissipated thereby only can be supplied to a waste heat utilization at unreasonably large expenditure.

Further features, advantages and possible applications of the invention can be taken from the following description of the drawings. All features described and/or illustrated form the subject-matter of the invention per se or in any combination, independent of their inclusion in the claims or their back-references.

Figure 1:
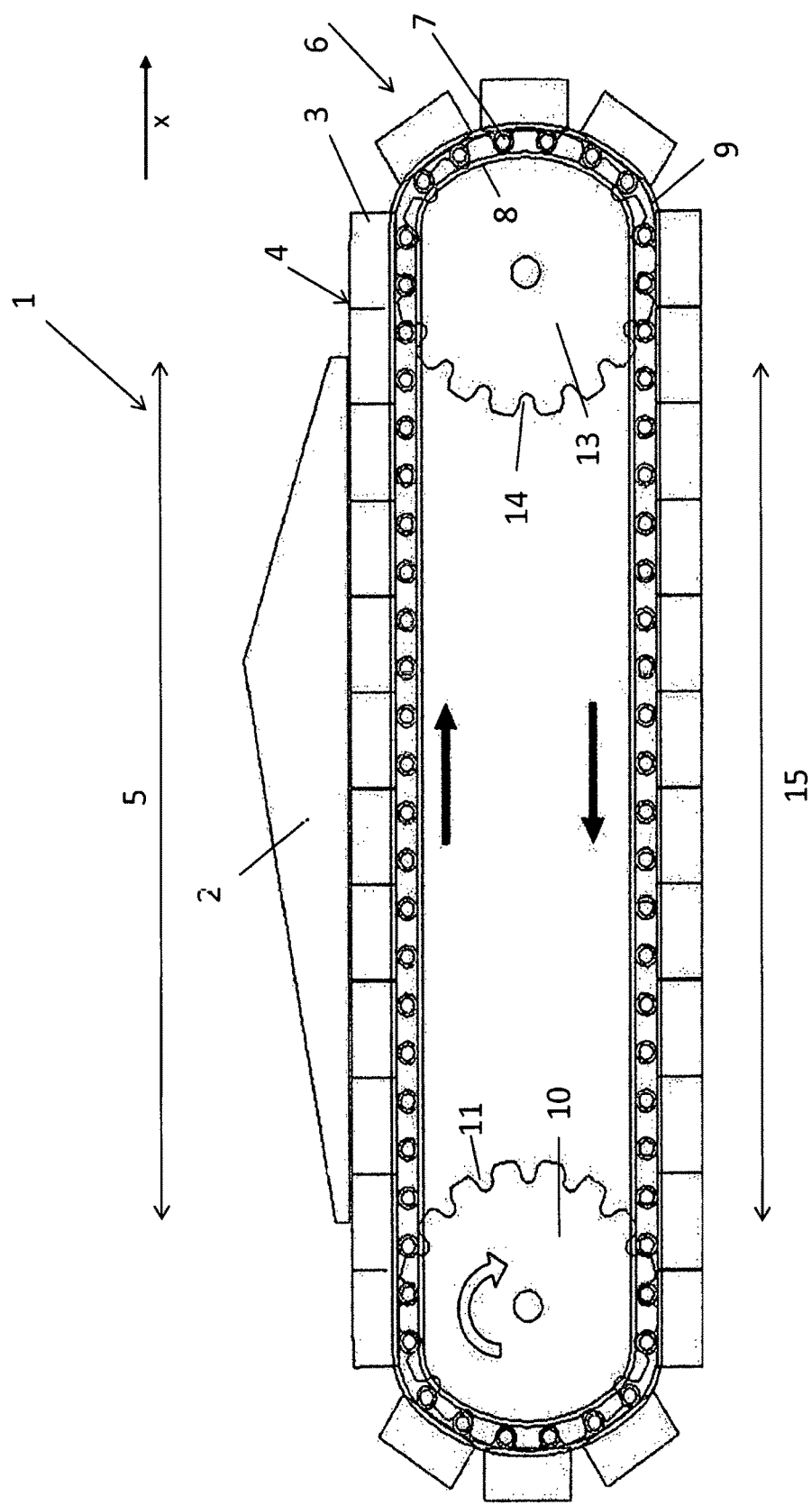
FIG. 1 shows the construction of a traveling grate.

FIG. 1 already has been discussed in detail and represents the basic arrangement of a traveling grate, as it is also underlying the present invention.

Figure 2:
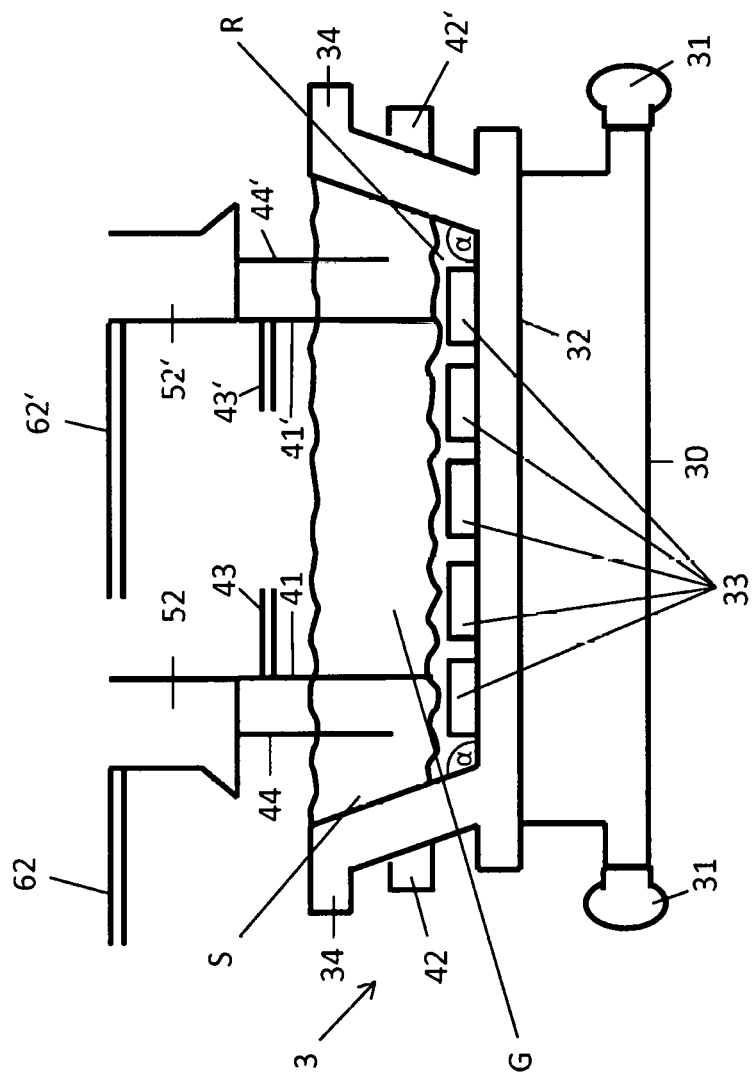
FIG. 2 shows the charging of a pallet car according to the invention.

FIG. 2 shows a pallet car 3. Its frame 30 is equipped with rollers 31 and also includes cross-beams 32. On these cross-beams 32 the grate bars 33 are arranged.

On these grate bars 33 the so-called hearth layer R is applied, which substantially extends as area above the grate surface of the pallet car 3 formed by cross-beams 32 and grate bars 33. According to the invention, the hearth layer R consists of fired pellets with a mean diameter between 10 and 20 mm, wherein the diameter of at least 85 wt-% of the pellets lies in the range between 10 and 20 mm.

From the pallet car 3 two opposed side walls 34 extend from the grate surface at an angle α, whose inner surfaces are parallel to the direction of movement of the traveling grate, which in FIG. 2 leads into the drawing plane.

Via the depicted chutes 52, 52' a so-called side layer S can be applied on these side walls. According to the invention, this side layer consists of pellet breakage and/or pellets of two fractions A and B. Pellet breakage in the sense of the invention refers to parts of the fired pellets. Fraction A includes pellets with a mean diameter of 5 to 13 mm, wherein at least 85 wt-% of the pellets of fraction A have a diameter between 5 and 13 mm. Fraction B contains pellets with a mean diameter greater than 14 mm, wherein the diameter of at least 85 wt-% of the pellets of fraction B is greater than 14 mm. The side layer contains between 0 and 100 wt-% pellets of fraction A and for the other part pellet breakage and/or pellets of fraction B. As a result, a very high bulk density and hence low permeability can be produced in the side layer S.

To ensure a bed of the side layer S extending uniformly on the side walls 34, partitions 41, 41' are used in general, which at an angle in the range between 85° and the angle α, based on the grate surface, at least partly protrude into the pallet car 3. Preferably, they protrude into the pallet car 3 to such an extent that they end directly at the height of the surface of the hearth layer R. To be able to omit further fastening devices, the partitions 41 and 41' are attached to the chutes 52 and 52'. The chutes 52 and 52' are charged with the material for the side layer S by the conveyor belts 62 and 62'.

Furthermore, vibration devices 42, 42' are provided, by which the side walls 34 can be vibrated, preferably in their natural frequency. Virtually exclusively the side layer S thereby is vibrated and compacted further, whereby its permeability can be lowered further. There are also provided vibration devices 43, 43' by which the partitions 41, 41' can be vibrated, which likewise serves a compaction of the side layer S. In addition, the vibration devices 44 and 44' either can be introduced into the side layer S by being designed for example as vibrating bars or they can act on the side layer S in the manner of a punch and thus further compact the same by vibration. What also is possible is the use of only one vibration device 42, 43 or 44 or any combination of these possibilities. Enclosed by the side layer S and the hearth layer R the green pellet layer G also is located within the pallet car, which contains the material to be cured, which preferably is configured as bed of green pellets.

Figure 3:
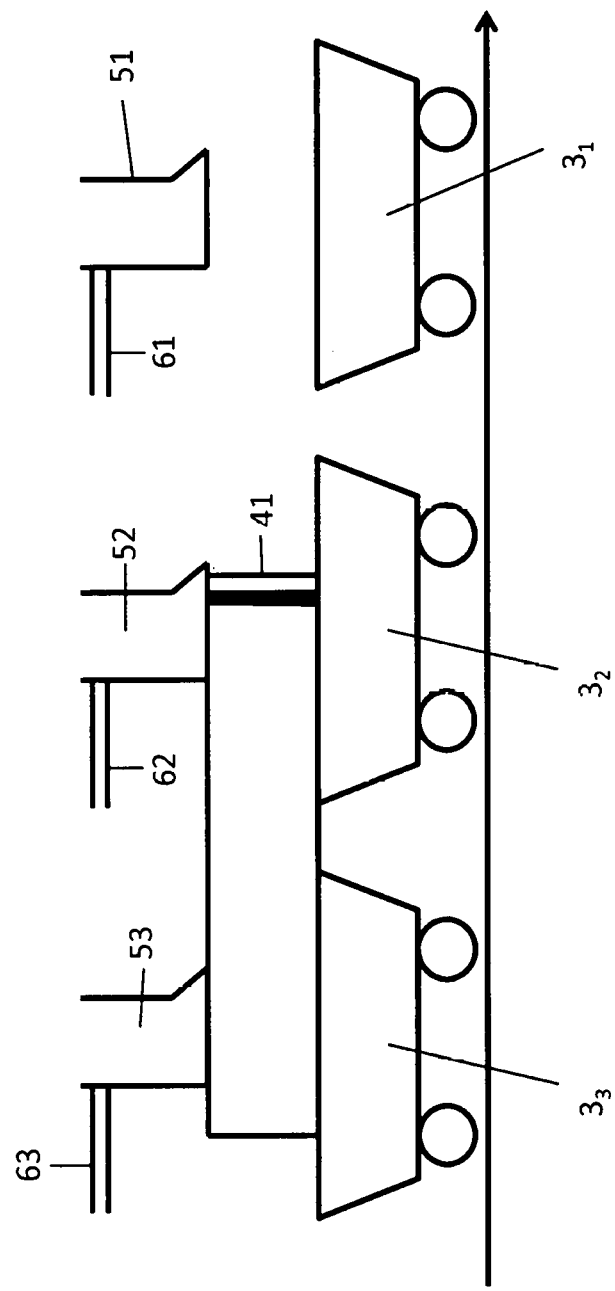
FIG. 3 shows the charging of pallet cars according to the invention.

FIG. 3 shows the section of a traveling grate within the charging zone. A plurality of pallet cars $3_n$ are arranged symbolically. The foremost pallet car 31 just passes through the charging zone with the hearth layer R, which is applied through at least one chute 51 which is charged via the conveyor belt 61. The pallet car 32 just passes through the charging zone with the side layer S, wherein the chute 52 is formed such that the partition 41 is attached to the same, which on passing of the pallet cars 3 at least partly extends into the pallet car below the chute 52 such that it extends substantially parallel to the side wall 34 and thus the side layer S can be piled up between side wall 34 and partition 41. The chute 52 is charged by means of the conveyor belt 62.

In the configuration shown the discharge openings of chute 52 just like the opposed parallel chute 52', which is not shown, also protrude to the front beyond the front edge of partition 41, so that in the region which already has left behind the front edge of the partition 41, material can be introduced and thus sagged areas in the surface of the side layer S produced by the passage of the partition 41 in direction of movement of the traveling grate can be filled up.

The pallet car 33 finally is in the position of being charged with the green pellet layer G via the charging device 53, which is charged by means of the conveyor belt 63.

LIST OF REFERENCE NUMERALS 1 pellet induration machine
2 hood
3 pallet car
4 traveling grate, pallet car chain
5 upper run
6 continuous conveyor
7 track roller of the pallet car
8 inner rail guide
9 outer rail guide
10 lifting or drive wheel
11 tooth gap
13 lowering or driven wheel
14 tooth gap
15 lower run
30 pallet car frame
31 roller
32 cross-beam
33 grate bars
34 side wall
41, 41' partition
42, 42' vibration device for side wall
43, 43' vibration device for partition
44, 44' vibration device to be applied or to be introduced
51 chute for hearth layer
52, 52' chute for side layer
53 charging device for green pellets
61 conveyor belt for hearth layer
62, 62' conveyor belt for side layer
63 conveyor belt for green pellets
R hearth layer
S side layer
G green pellet layer

The invention claimed is:

1. A method for charging pallet cars of a traveling grate for the thermal treatment of bulk material, in a first step comprising an application of a first layer as hearth layer on a grate surface of the pallet car and in at least one second step comprising the simultaneous or successive charging with a second layer as side layer on two opposed side walls of the pallet car and with a third layer as green pellet layer between the side layers and on the hearth layer, wherein the hearth layer includes fired pellets with a mean diameter between 10 and 20 mm, wherein the diameter of at least 85 wt-% of the pellets lies in the range between 10 and 20 mm, that the side layer contains pellet breakage and/or fired pellets of a mixture of two fractions A and B, wherein the material of fraction A has a mean diameter between 5 and 13 mm and the diameter of at least 85 wt-% of the material of fraction A lies in the range between 5 and 13 mm, wherein the material of fraction B has a mean diameter greater than 14 mm and the diameter of at least 85 wt-% of the pellets of fraction B is greater than 14 mm, and wherein the side layer consists of fraction A for between 0 and 100 wt-% and of fraction B for between 0 and 100 wt-%, and that the green pellet layer includes thermally untreated pellets with a mean diameter at least 2 mm greater than the mean diameter of fraction A.

2. The method according to claim 1, wherein the side layer contains between 20 and 90 wt-% of fraction A.

3. The method according to claim 1, wherein during and/or after charging with the side layer the side walls adjoining the side layer and/or a partition between side layer and green pellet layer and/or at least one device placed on and/or introduced into the side layer vibrates or vibrate.

4. The method according to claim 3, wherein the vibration has the natural frequency of the side walls.

5. The method according to claim 3, wherein after vibrating and/or passing the partition the side layer is filled up with pellet breakage and/or pellets of fraction A and/or B.

6. The method according to claim 1, wherein the hearth layer has a layer thickness between 3 and 10 cm.

7. The method according to claim 1, wherein the side layer has a layer thickness between 5 and 15 cm.

8. The method according to claim 1, wherein the pellets for hearth layer and side layer are taken from the total content of the pallet car after curing of the bulk material and recirculated to the charge.

9. A plant for charging pallet cars of a traveling grate for the thermal treatment of bulk material, comprising in a charging zone at least one chute for applying a first layer as hearth layer on a grate surface of the pallet cars and at least one second chute for charging with at least one second layer as side layer on two opposed side walls of the pallet car and a charging device for introducing a third layer as green pellet layer on the hearth layer and between the side layers, wherein the at least one chute for applying the hearth layer and the at least second chute for charging with the side layer is fed by two separate conveyor belts and further comprising a partition attached to the at least one second chute for charging with the side layer.

10. The plant according to claim 9, wherein the partition is aligned parallel to the direction of movement of the traveling grate at an angle α in a range between the angle of the side wall and 85°, and whose lower edge at least partly protrudes into the pallet car during operation of the traveling grate.

11. The plant according to claim 9, wherein the partition is aligned such that during operation it protrudes into the pallet car such that it ends exactly at the height of the surface of the hearth layer.

12. The plant according to claim 9, wherein at least one device for vibrating the side walls adjoining the side layer and/or a device for vibrating the partition is provided between side layer and green pellet layer and/or a device is provided for application on and/or introduction into the side layer.

13. The plant according to claim 9, wherein the at least one second chute is configured such that it also fills at a position at which the pallet car in operation of the traveling grate already has passed the partition and/or at least one device for vibrating the side layer.

14. The plant according to claim 9, further comprising first and second conveyor belts for the transport of material for charging pallet cars whereby the first conveyor belt conveys material for a hearth layer and the second conveyor belt conveys material for charging a side layer.

* * * * *